(12) United States Patent
Wayne et al.

(10) Patent No.: US 9,653,763 B2
(45) Date of Patent: May 16, 2017

(54) BATTERY PACK COMPRISING A HEAT EXCHANGER

(71) Applicant: GrafTech International Holdings Inc., Parma, OH (US)

(72) Inventors: Ryan J. Wayne, Brecksville, OH (US); Jonathan Andrew Taylor, Cleveland, OH (US)

(73) Assignee: Advanced Energy Technologies LLC, Lakewood, OH (US)

( * ) Notice: Subject to any disclaimer, the term of this patent is extended or adjusted under 35 U.S.C. 154(b) by 47 days.

(21) Appl. No.: 13/724,211

(22) Filed: Dec. 21, 2012

(65) Prior Publication Data

US 2013/0171493 A1    Jul. 4, 2013

Related U.S. Application Data

(60) Provisional application No. 61/581,675, filed on Dec. 30, 2011.

(51) Int. Cl.
| | | |
|---|---|---|
| *H01M 10/52* | (2006.01) | |
| *F28D 1/00* | (2006.01) | |
| *F28F 3/12* | (2006.01) | |
| *F28F 21/06* | (2006.01) | |
| *H01M 10/647* | (2014.01) | |
| *H01M 10/6557* | (2014.01) | |

(52) U.S. Cl.
CPC .......... *H01M 10/5032* (2013.01); *F28D 1/00* (2013.01); *F28F 3/12* (2013.01); *F28F 21/065* (2013.01); *H01M 10/647* (2015.04); *H01M 10/6557* (2015.04)

(58) Field of Classification Search
CPC ......... H01M 10/50; F28D 1/00; F28F 21/065; F28F 3/12; H01B 1/00
USPC ........... 429/71, 120; 165/41, 46, 84, 104.19, 165/104.34, 157, 168, 169, 170, 171, 172, 165/177, 186
See application file for complete search history.

(56) References Cited

U.S. PATENT DOCUMENTS

| | | | |
|---|---|---|---|
| 7,836,597 B2 * | 11/2010 | Datta et al. | 29/890.041 |
| 2005/0089750 A1 * | 4/2005 | Ng et al. | 429/120 |
| 2006/0021745 A1 * | 2/2006 | Fritze et al. | 165/172 |
| 2007/0158050 A1 | 7/2007 | Norley et al. | |
| 2009/0101306 A1 | 4/2009 | Reis et al. | |
| 2010/0314081 A1 * | 12/2010 | Reis et al. | 165/134.1 |
| 2011/0151300 A1 * | 6/2011 | Herrmann | 429/120 |
| 2013/0209858 A1 | 8/2013 | Schmitt et al. | |

OTHER PUBLICATIONS

International Search Report and Written Opinion for PCT/US12/71273, issued by the US International Search Authority on Apr. 29, 2013.

* cited by examiner

*Primary Examiner* — Sarah A Slifka

(57) ABSTRACT

A heat exchanger assembly includes a fluid transfer layer and a first external layer. The fluid transfer layer is made from an elastomeric material and the first external layer includes flexible graphite. The fluid transfer layer includes at least one channel and is configured to form a passage for receiving a thermal transfer fluid between the channel and a portion of the first external layer.

11 Claims, 4 Drawing Sheets

BATTERY PACK COMPRISING A HEAT EXCHANGER

This application claims the benefit of U.S. Provisional Application 61/581,675 filed Dec. 30, 2011, entitled Battery Heat Exchanger, which is hereby incorporated herein in its entirety by reference.

BACKGROUND

Lithium ion batteries require thermal management to ensure their performance, durability and safety. Performance may be compromised at low temperatures and durability may be compromised at high temperatures. "Prismatic pouch" format cells are typically of a rectangular prism shape and have large, generally flat parallel planar surfaces roughly corresponding to the "active area" dimensions of the anode, cathode and separators. In typical battery thermal management designs, heat generated during operation is transported away from the cells through heat transfer plates manufactured from aluminum. However, aluminum is relatively rigid and thus can be problematic for the battery pack designers. The Li-ion cells can shrink or swell due to thermal expansion and the effects of aging which can affect the thermal contact between the cell and heat exchange plate.

SUMMARY OF THE INVENTION

According to one aspect of the present invention a heat exchanger assembly includes a fluid transfer layer made from an elastomeric material and having opposed major surfaces. A first external layer includes flexible graphite and has an interior facing major surface and external facing major surface. The interior facing major surface is secured to one of the fluid transfer layer major surfaces. The fluid transfer layer includes at least one channel and is configured to form a passage for receiving a thermal transfer fluid between the at least one channel and a portion of the interior facing major surface of the first external layer.

According to another aspect of the present invention, a battery pack assembly includes a plurality of rectangular battery cells, each having two opposed major surfaces and arranged in a stacked configuration. A heat exchanger assembly includes a fluid transfer layer made of an elastomeric material and having opposed major surfaces. A first external layer includes flexible graphite and has an interior facing major surface and external facing major surface. The interior facing major surface is secured to one of the fluid transfer layer major surfaces. The fluid transfer layer includes at least one channel and is configured to form a passage for receiving a thermal transfer fluid between the at least one channel and a portion of the interior facing major surface of the first external layer. The heat exchanger is folded in a repeating serpentine shape forming a plurality of U-shaped portions. The plurality of rectangular battery cells are received in the plurality of U-shaped portions.

DETAILED DESCRIPTION OF THE EMBODIMENTS

Figure 1:
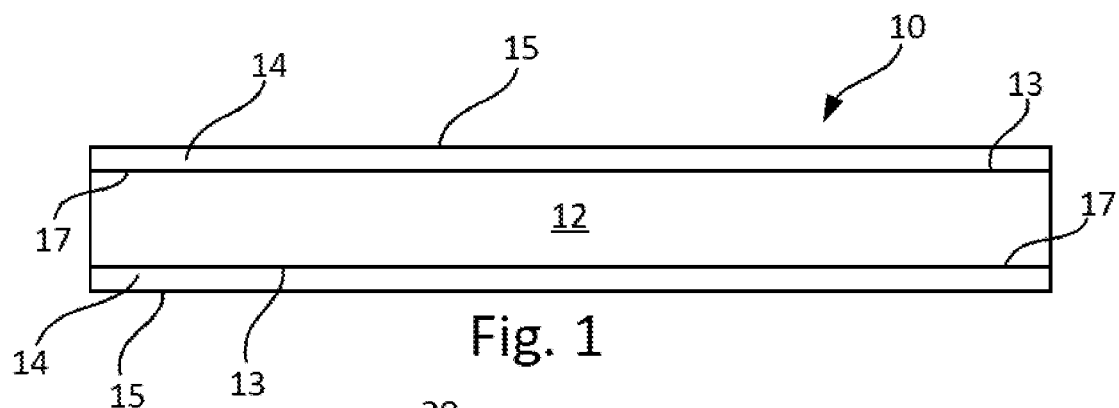
FIG. 1 is a front view of a heat exchange assembly.

Large format prismatic lithium-ion cells have certain advantages over conventional prismatic or cylindrical cells. When used in multi-cell battery packs, the large format prismatic lithium-ion cells have relatively higher energy density and substantially lower possibility of battery failure due to "hot" cell problems. Electrically, a battery pack assembly is made by assembling a plurality of prismatic lithium-ion cells in series to add up voltage, or in parallel which increases capacity.

In one embodiment, the prismatic lithium-ion cell is generally rectangular or square shaped and has a thickness of from about 1 mm to about 10 mm. More preferably, the cell has a thickness of from about 3 mm to about 6 mm. In one embodiment of the battery pack, the prismatic lithium-ion cell has opposed major surfaces, each major surface footprint being at least 8 square inches, more preferably a footprint of at least 16 square inches. In one embodiment, the footprint is from about 49 square inches to about 400 square inches. In another embodiment, the footprint is from about 16 square inches to about 2500 square inches. In another embodiment, the foot print is from about 50 square inches to about 200 square inches.

As used herein, the term "cell" or "battery cell" means an electrochemical cell made of at least one positive electrode, at least one negative electrode, an electrolyte, and a separator membrane. The term "cell" and "battery cell" are used interchangeably. The "battery" or "battery pack" means an electric storage device made of more than two cells. The terms "battery" and "battery pack" are used interchangeably.

Large format prismatic cells are advantageously assembled into battery packs in a stacked configuration, wherein the major surfaces of each cell are facing the major surfaces of adjacent cells. This stacked arrangement maximizes the energy density, but is not conducive to transferring the heat away from the cells. This is particularly true of the interior cells of the battery pack located relatively far from one of the exterior surfaces of the battery pack. To facilitate heat transfer, one or more heat exchange assemblies may be inserted in the spaces between the stacked prismatic cells. The heat exchange assembly may improve performance and life of the cells by reducing thermal gradients and transporting heat directly to the surroundings of the pack or to a heat sink.

In one embodiment, a heat exchange assembly is relatively more flexible than aluminum. Further, the heat exchange assembly is advantageously conformable to accommodate dimensional changes, non-flatness, and to improve interfacial thermal conductivity. Further, the heat exchange assembly may provide for enhanced control of energy storage device temperatures during normal and cold-start operations. The heat exchange assembly may be particularly well-suited for controlling the temperature of high energy, high power density rechargeable electrochemical cells arranged in a "stacked" relationship, such as an arrangement of prismatic lithium ion cells defining a rechargeable module or battery, for example.

Advanced rechargeable lithium ion cells, for example, may be subject to significant volumetric changes during charge and discharge cycling due to anode state changes. This creates challenges for cooling operations. Also, such advanced rechargeable batteries may require maintenance of uniform stack and cell pressures. Intimate contact between an arrangement of electrochemical cells and a heat exchanger plate is advantageously maintained in the presence of significant cell expansion and contraction, which provides for enhanced temperature control, improved cell performance, and extend cell life. In energy storage device applications in which compressive pressure within a cell arrangement (e.g., a cell stack arrangement or a cluster arrangement) is needed or desired, the requisite cell stack pressure may be passively maintained during cell expansion and contraction by the intrinsic properties of the heat exchanger plate described herein below. In such applications, a temperature control apparatus may advantageously provide the requisite thermal and pressure control for an arrangement of electrochemical cells, thereby obviate the need for a separate temperature and/or pressure control system, simplify pack assembly and reduce pack weight.

The heat exchange assembly may advantageously be formed from multiple layers, wherein a flexible graphite sheet may form an external layer(s) and a deformable material forms a fluid transport layer which includes features that enable a heat transfer fluid to pass therethrough.

The flexible graphite sheet may be optionally thin and sheet-like, having two opposed major surfaces. In one embodiment, the flexible graphite sheet may be less than about 2 mm thick. In other embodiments the flexible graphite sheet may be less than about 1 mm thick. In still other embodiments, the flexible graphite sheet may be less than about 0.5 mm thick. In still further embodiments, the flexible graphite sheet is less than about 0.010 mm thick. In still further embodiments, the flexible graphite sheet is from between about 0.010 mm thick and about 2 mm thick. In still further embodiments, the flexible graphite sheet is from between about 0.5 mm thick and about 1 mm thick. According to one or more embodiments, flexible graphite sheet may be a sheet of a compressed mass of exfoliated graphite particles, a sheet of graphitized polyimide or combinations thereof.

The flexible graphite sheet may have an in-plane thermal conductivity of greater than about 250 W/mK at about room temperature (using the Angstrom method to test at room temperature being approximately 25° C.). In another embodiment the in-plane thermal conductivity of the flexible graphite sheet is at least about 400 W/mK. In yet a further embodiment, the in-plane thermal conductivity of the flexible graphite sheet may be at least about 550 W/mK. In additional embodiments, the in-plane thermal conductivity of the flexible graphite sheet may range from at least 250 W/mK to at least about 1500 W/mK. It is further preferred that at least one of the flexible graphite sheets has an in-plane thermal conductivity of at least about twice the in-plane thermal conductivity of aluminum. Furthermore, each flexible graphite sheet may have the same or different in-plane thermal conductivities. Any combination of the above in-plane thermal conductivities may be practiced. In one embodiment, the flexible graphite sheet may be from 10 to 1500 microns thick. In other embodiments the flexible graphite sheet may be from 0.1 to 0.5 millimeters thick. Suitable graphite sheets and sheet making processes are disclosed in, for example, U.S. Pat. Nos. 5,091,025 and 3,404,061, the contents of which are incorporated herein by reference.

In an optional embodiment, one or more flexible graphite sheets may be resin reinforced. The resin may be used, for example, to improve the strength of the flexible graphite sheet and/or the impermeability of the flexible graphite sheet. In combination with resin reinforcement, or in the alternative, one or more flexible graphite sheets may include carbon and/or graphite fiber reinforcement. In such an embodiment, the flexible graphite sheet may include a sufficient amount of reinforcement to assist with or provide structural integrity to the flexible graphite sheet.

The flexible graphite sheet is a more conformable material than conventional materials used in a pack for heat spreading (ex. aluminum). Use of the flexible graphite sheet offers a reduction in interfacial thermal heat transfer resistance between flexible graphite sheet and a battery cell as compared to a conventional material. Because the flexible graphite sheet is more conformable, interfacial thermal heat transfer between cells having non-flat major surfaces is better than conventional materials.

If inter-cell electrical isolation is desired, the exterior surface of the flexible graphite sheet may optionally be coated with an electrically insulating film, wherein the film is substantially thin enough not to appreciably impede heat transfer to the flexible graphite sheet. Exemplary films include PET and polyimide films.

The flexible graphite sheet may optionally be coated with a film adhesive on the exterior facing surface, wherein the adhesive layer is thin enough not to appreciably impede heat transfer to the flexible graphite sheet. In one embodiment, the film adhesive may be from between about 5 μm to about 25 μm thick. In further embodiments the film adhesive may be from between about Battery packs assembled with flexible graphite sheet incorporating the film adhesive may reduce or substantially eliminate the need for potting compounds (such as silicone or polyurethane) used to prevent cells from shifting under inertial forces and vibration, as is commonly practiced in battery pack constructions incorporating conventional thermal transfer materials.

In any one or more of the above embodiments, the flexible graphite sheet may further be a composite material. For example, each flexible graphite sheet may include a plurality of individual graphite sheets secured together.

In one embodiment, the deformable material of the fluid transport layer includes an elastomer material. In one embodiment, the deformable material includes an elastomer and one or more thermally conductive additives. In still further embodiments, the thermally conductive additive is graphite. In this or other embodiments the elastomer and optional additives may be selected such that the fluid transport layer has at least about 3%, more preferably at least about 5% and most preferably at least about 10% compressibility when compressed under ten (10) psi loading. Further, the fluid transport layer advantageously exhibits at least about 80% recovery, more advantageously at least about 90% recovery and most advantageously at least about 95% recovery after compression under 10 psi loading. The deformable material is advantageously thermally and mechanically stable at temperatures up to at least about 80 degrees centigrade and chemically stable when contacting fluids used for heat transfer including but not limited to water, glycol and mixtures thereof. Appropriate elastomer materials may include, for example, silicone rubbers, silicone foams, urethane rubbers, rubber modified epoxies, and materials suitable for use as a fluid sealing gasket material. The thickness of the fluid transport layer is selected such that the volume of the interior compartment formed by joining the fluid transport layer to the exterior layer(s) is sufficient to accommodate the required flow rate of cooling fluid with minimal pressure drop.

In one embodiment the fluid transfer layer is from between about 0.25 mm and about 2 mm thick. In other embodiments, the fluid transfer layer is from between about 0.5 mm and about 1.5 mm thick. In still further embodiments the fluid transfer layer is less than about 2 mm thick.

The heat exchange assembly of the present invention may have a single interior compartment within which the heat transfer medium is contained or a multiplicity of such interior compartments, or a series of serpentine or parallel flow channels, or combinations thereof. The heat exchange assembly may be provided with a single inlet port and a single outlet port, in the case of a serial flow arrangement, or may have multiple inlet ports and multiple outlet ports, in the case of a parallel flow arrangement or an arrangement involving a multiplicity of serial or parallel flows. Single inlet-multiple outlet port configurations can also be employed, as can multiple inlet, single outlet port arrangements. Manifolds through which the heat transfer fluid enters and exits the assembly may be either internal (through the face of the plate) or external (through the side of the plate).

For relatively simple flow channel geometries, the channels of said fluid transport layer can be formed in sheets of elastomer or graphite/elastomer composite by numerous manufacturing processes known in the art including, but not limited to machining, calendar embossing, extrusion, sheet molding, injection molding, casting, and combinations thereof. When more complicated geometries are required, thermosetting epoxies or composites of graphite and thermosetting epoxies can be cast in place around a sacrificial core material that is solid at room temperature, but becomes liquid and flows out of the plate, defining a flow channel at a temperature between the temperatures required to "B-stage" the epoxy and its final cure temperature. An example of such a core material is paraffin wax.

Advantageously, one or more layers of the heat exchange assembly are not electrically conductive or include a non-conductive coating. This may help prevent electrical short circuits in the event of damage to the battery pack (for example in a motor vehicle crash). In one embodiment, additional electrical isolation may be achieved by laminating or shrink wrapping the heat exchange assembly with a thin film of a thermoplastic material such as, for example, polyethylene or PET. A further advantage of the disclosed heat exchange assembly is the fact that its materials of construction (graphite and elastomers) have intrinsic vibration damping qualities, which dampen the shock and vibration during automotive driving cycles and ultimately prolong the life of cells and pack components exposed to harsh conditions.

The heat exchange plate can be readily inserted during assembly of a cell stack arrangement, such that contact between surface of the cell adjacent the cells' active area and the heat exchange assembly is maximized. The deformable heat exchange assembly may be formed to take on a variety of shapes, sizes, and lengths to accommodate a wide variety of cell stack geometries. For example, the heat exchange assembly for a given cell stack arrangement may take on a complex, continuous shape that contacts a multiplicity of cells or a simple rectangular or square shape that contacts a single cell or pair of adjacent cells.

Figure 2:
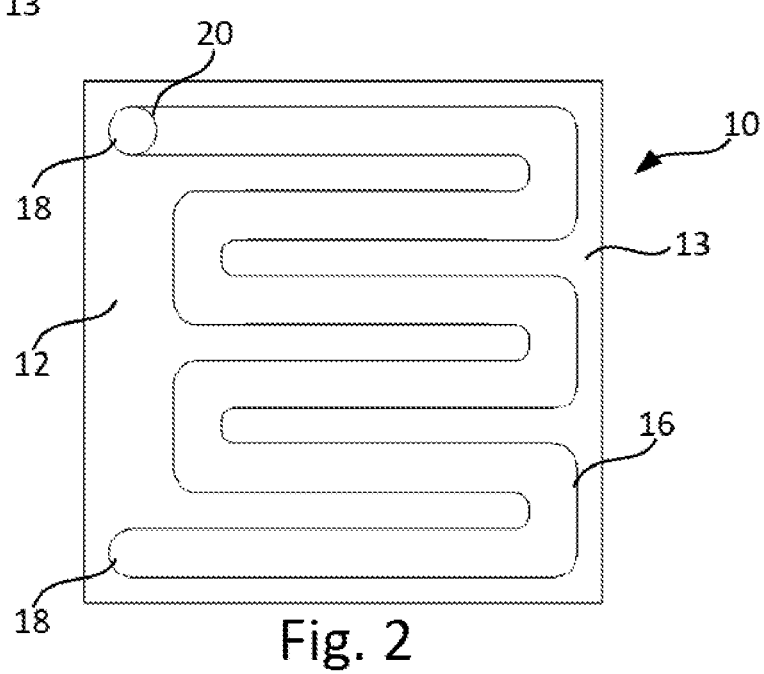
FIG. 2 is a top view of the heat exchange assembly of FIG. 1 with the top external layer removed to more clearly show the fluid channels.
Figure 3:
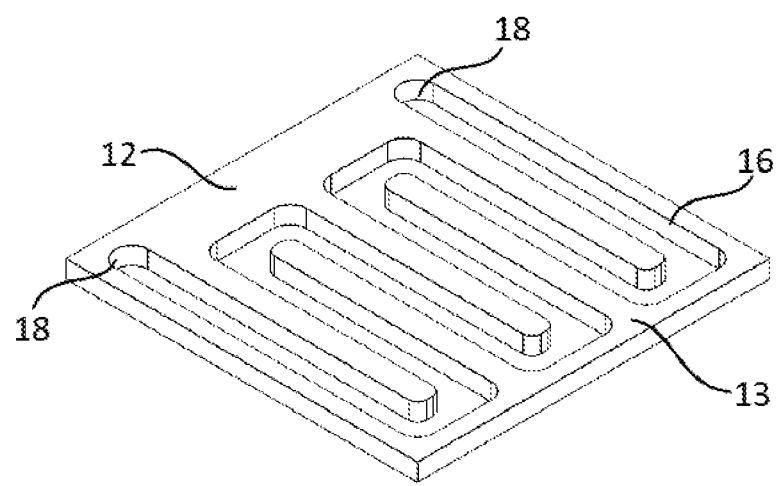
FIG. 3 is an elevated isometric view of the fluid transfer layer of the heat exchange assembly of FIG. 1.

With reference now to FIGS. 1-3 a heat exchange assembly is shown and generally indicated by the numeral 10. Assembly 10 includes a fluid transfer layer 12 positioned between a pair of opposed external layers 14. The fluid transfer layer 12 includes major surfaces 13 on opposed sides thereof and external layers 14 include an external facing major surface 15 and an internal facing major surface 17. A serpentine shaped channel 16 is formed in fluid transfer layer 12, and at each channel end 18 an opening 20 is formed in the external layer 14. A thermal transfer fluid may be provided to and removed from the heat exchange assembly 10 continuously via the openings 20. Thus, the thermal transfer fluid may flow through the passage formed by channel 16 and the opposed internal facing major surfaces 17 of external layers 14. Fluid transfer layer 12 may be secured to external layers 14 by any means including, for example, adhesives and/or mechanical fasteners.

Figure 4:
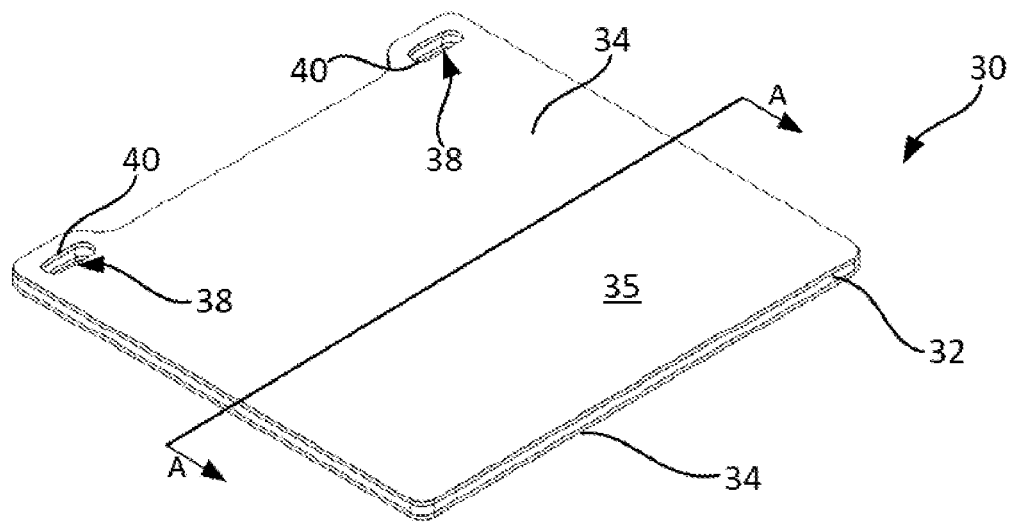
FIG. 4 is an elevated isometric view of an alternate embodiment of a heat exchange assembly.
Figure 5:
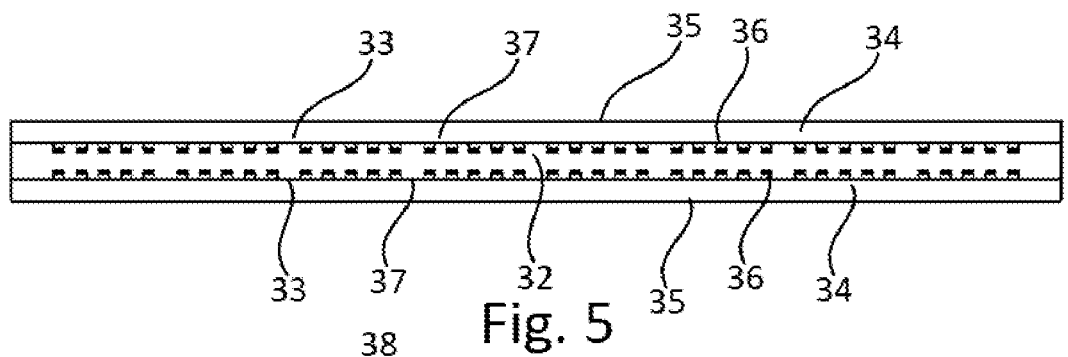
FIG. 5 is a section view taken along line A-A of FIG. 4.
Figure 6:
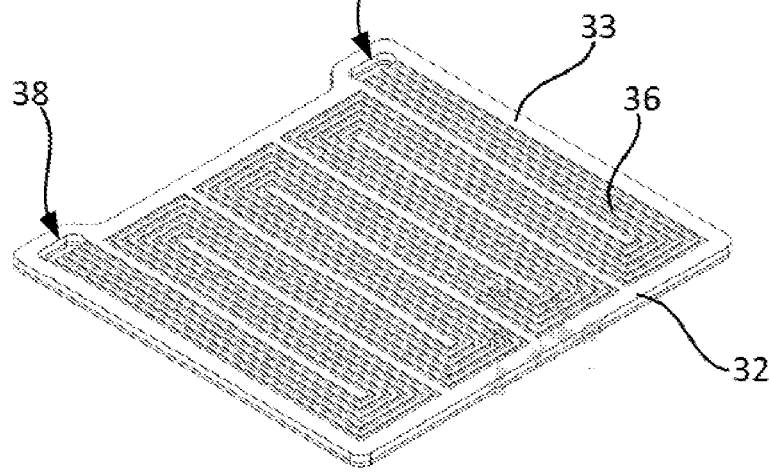
FIG. 6 is an elevated isometric view of the fluid transfer layer of the heat exchange assembly of FIG. 4.

With reference now to FIGS. 4-6, an alternate embodiment of the heat exchange assembly is shown and generally indicated by the numeral 30. Assembly 30 includes a fluid transfer layer 32 positioned between a pair of opposed external layers 34. The fluid transfer layer 32 includes major surfaces 33 on opposed sides thereof and external layers 34 include an external facing major surface 35 and an internal facing major surface 37. A plurality of spaced aligned serpentine shaped channels 36 are formed on both major surfaces 33 of fluid transfer layer 32. At each channel end 38 an opening 40 is formed in the external layer 34. A thermal transfer fluid may be provided to and removed from the heat exchange assembly 30 continuously via the openings 40. Thus, the thermal transfer fluid may flow through the passages formed by channels 36 and the internal facing major surfaces 37 of external layers 34. Fluid transfer layer 32 may be secured to external layers 34 by any means including, for example, adhesives and/or mechanical fasteners.

Figure 7:
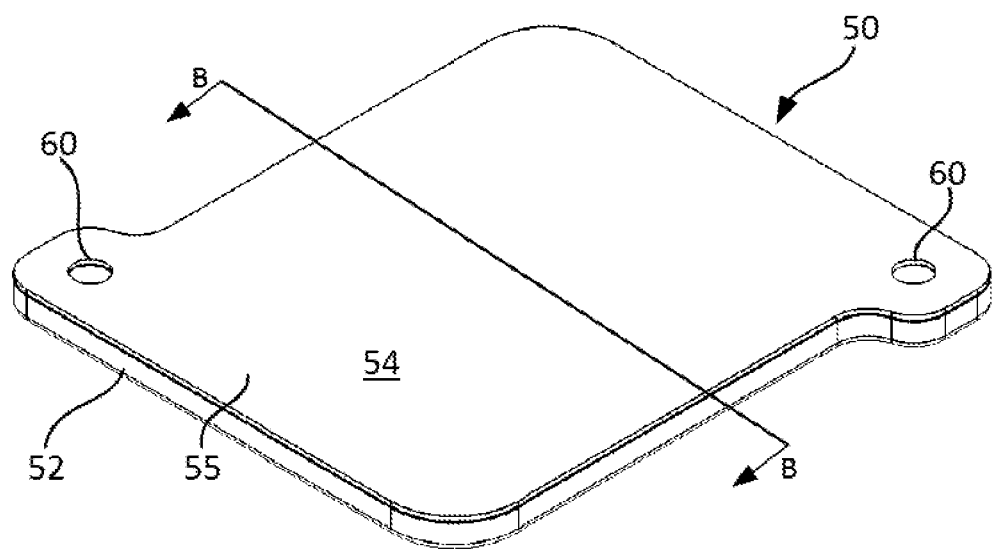
FIG. 7 is an elevated isometric view of a further alternate embodiment of a heat exchange assembly.
Figure 8:
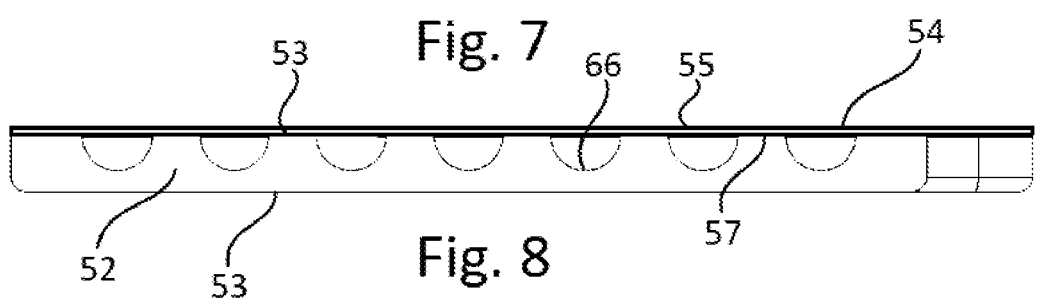
FIG. 8 is a section view taken along line B-B of FIG. 7.
Figure 9:
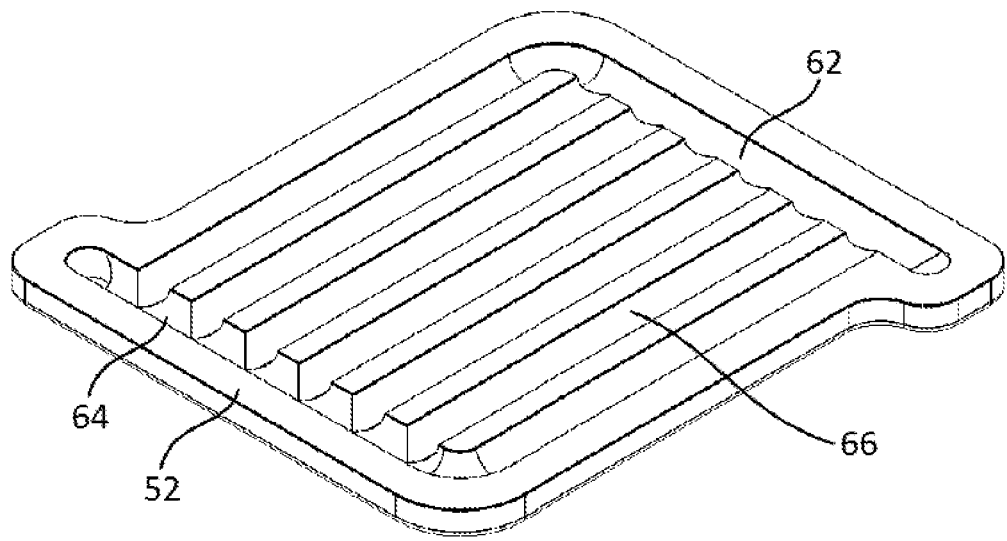
FIG. 9 is an elevated isometric view of the fluid transfer layer of the heat exchange assembly of FIG. 7.

With reference now to FIGS. 7-9, an alternate embodiment of the heat exchange assembly is shown and generally indicated by the numeral 50. As can be seen, instead of a three-layer configuration, assembly 50 includes a fluid transfer layer 52 and a single external layer 54. The fluid transfer layer 52 includes major surfaces 53 on opposed sides thereof and external layer 54 includes an external facing major surface 55 and an internal facing major surface 57. A plurality of channels are formed on one major surface 53 of fluid transfer layer 52 and are configured as an input channel 62, and output channel 64 and a plurality of spaced parallel connecting channels 66. A pair of openings 60 are formed in the external layer 54. A thermal transfer fluid may be provided to and removed from the heat exchange assembly 50 continuously via the openings 60. Thus, the thermal transfer fluid may flow through the passages formed by channels 62/64/66 and the internal facing major surface 57 of external layer 54. Fluid transfer layer 52 may be secured to external layers 54 by any means including, for example, adhesives and/or mechanical fasteners.

Figure 10:
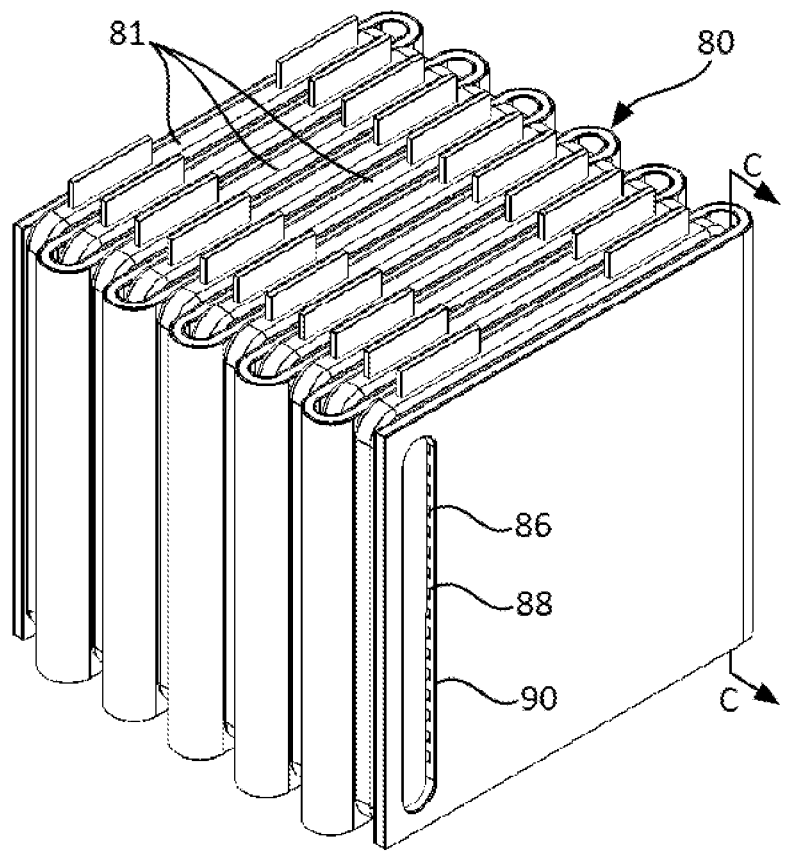
FIG. 10 is an elevated isometric view of a battery stack including a heat exchange assembly.
Figure 11:
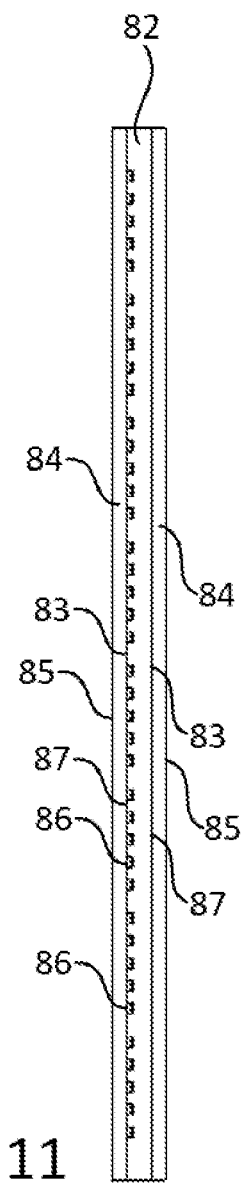
FIG. 11 is a section view of the heat exchange assembly taken along line C-C of FIG. 10.

With reference now to FIGS. 10 and 11, an alternate embodiment of a heat exchange assembly 80 is shown and arranged with a plurality of battery cells 81 arranged in a stacked configuration. Assembly 80 includes a fluid transfer layer 82 positioned between a pair of opposed external layers 84. The fluid transfer layer 82 includes major surfaces 83 on opposed sides thereof and external layers 84 include an external facing major surface 85 which engages battery cells 81 and an internal facing major surface 87. A plurality of spaced aligned channels 86 are formed on one of the major surfaces 83 of fluid transfer layer 82 and terminate at a channel ends 88 (located proximate to the longitudinal ends of assembly 80) where an opening 90 is formed in the external layer 84. A thermal transfer fluid may be provided to and removed from the heat exchange 80 continuously via the openings 90. Thus, the thermal transfer fluid may flow through the passages formed by channels 86 and the internal facing major surface 87 of one of external layers 84. Fluid transfer layer 82 may be secured to external layers 84 by any means including, for example, adhesives and/or mechanical fasteners.

Because of the relatively flexible nature of assembly 80, it may be bent and configured in a manner to enable contact with a stack of cells 81. Accordingly, as shown in FIGS. 10 and 11, the assembly 80 is configured in a serpentine shape wherein a cell 81 is interposed between each U-shaped section. It should be appreciated, however, that other configurations are contemplated. For example, two or more cells 81 may be positioned between each U-shaped section.

The various embodiments described herein can be practiced in any combination thereof. The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and/or steps in any arrangement or sequence that is effective to meet the objectives intended for the invention, unless the context specifically indicates the contrary.

What is claimed is:

1. A battery pack assembly comprising:
    a plurality of rectangular battery cells, each having two opposed major surfaces and arranged in a stacked configuration;
    a heat exchanger assembly comprising a fluid transfer layer comprising an elastomeric material and having opposed major surfaces and at least one channel formed in at least one of said opposed major surfaces; a first external layer comprised of flexible graphite, having a thickness of 10 to 1500 microns, and having an interior facing major surface and an external facing major surface, said interior facing major surface secured to one of said fluid transfer layer major surfaces, wherein said at least one channel and said interior facing major surface are configured to form a passage for receiving a thermal transfer fluid between said at least one channel and said interior facing major surface; and
    wherein said heat exchanger is folded in a repeating serpentine shape forming a plurality of U-shaped portions and said plurality of rectangular battery cells are received in said plurality of U-shaped portions.

2. The battery pack assembly of claim 1 comprising the heat exchanger assembly wherein said flexible graphite material comprises a compressed exfoliated graphite sheet.

3. The battery pack assembly of claim 2 comprising the heat exchanger assembly wherein said compressed exfoliated graphite sheet is reinforced with resin.

4. The battery pack assembly of claim 3 wherein said thermal transfer fluid is in contact with said at least one channel and said interior facing major surface forming said passage.

5. The battery pack assembly of claim 1 comprising the heat exchanger assembly further comprising a second external layer comprised of flexible graphite and having an interior facing major surface and an external facing major surface, said interior facing major surface of said second external layer being secured to said fluid transfer layer major surface opposed from said first external layer.

6. The battery pack assembly of claim 1 comprising the heat exchanger assembly wherein said at least one channel is serpentine shaped.

7. The battery pack assembly of claim 1 comprising the heat exchanger assembly wherein said fluid transfer layer has a thickness and said at least one channel extends only partially into said thickness.

8. The battery pack assembly of claim 1 comprising the heat exchanger assembly wherein said elastomeric material comprises one or more thermal conductive, additives.

9. The battery pack assembly of claim 1 comprising the heat exchanger assembly wherein said fluid transfer layer has at least three percent compressibility under ten PSI loading.

10. The battery pack assembly of claim 1 comprising the heat exchanger assembly wherein said fluid transfer layer has at least ten percent compressibility under ten PSI loading.

11. The battery pack assembly of claim 1 comprising the heat exchanger assembly wherein said at least one channel includes a plurality of spaced parallel channels.

* * * * *